United States Patent [19]
Kerz

[11] Patent Number: 5,642,436
[45] Date of Patent: Jun. 24, 1997

[54] METHOD FOR GENERATING AND STORING DIGITALIZED DENSITY THRESHOLD VALUES FOR THE RASTERING OF A HALF-TONE PICTURE ORIGINAL

[75] Inventor: Ludo Kerz, Saulheim, Germany

[73] Assignee: Linotype-Hell AG, Kiel, Germany

[21] Appl. No.: 430,162

[22] Filed: Apr. 27, 1995

Related U.S. Application Data

[63] Continuation of Ser. No. 976,974, Jan. 19, 1993, abandoned.

[30] Foreign Application Priority Data

Jul. 18, 1990 [DE] Germany ............................ 40 22 772.3

[51] Int. Cl.⁶ .................................................. G06K 9/38
[52] U.S. Cl. ........................... 382/237; 382/270; 358/457; 358/459
[58] Field of Search ...................... 382/237, 270; 358/456, 457, 459, 460, 298, 534, 536

[56] References Cited

U.S. PATENT DOCUMENTS

| | | | |
|---|---|---|---|
| 3,657,472 | 4/1972 | Taudt et al. ........................ | 178/6.7 R |
| 3,681,650 | 8/1972 | Koll ...................................... | 358/459 |
| 4,245,260 | 1/1981 | Doelves .............................. | 358/299 |
| 4,308,553 | 12/1981 | Roetling ............................. | 358/75 |
| 4,350,996 | 9/1982 | Rosenfeld . | |
| 4,413,286 | 11/1983 | Boston ............................... | 358/283 |
| 4,468,442 | 8/1984 | Sakamoto .......................... | 430/30 |
| 4,499,489 | 2/1985 | Gall et al. . | |
| 4,680,646 | 7/1987 | Ikeda et al. ....................... | 358/298 |
| 4,752,822 | 6/1988 | Kawamura ......................... | 358/523 |
| 4,835,682 | 5/1989 | Kurachi et al. .................... | 364/200 |
| 4,918,622 | 4/1990 | Granger et al. ................... | 364/518 |
| 4,987,498 | 1/1991 | Shimazaki ......................... | 358/456 |
| 5,124,803 | 6/1992 | Troxel ................................. | 358/456 |
| 5,130,821 | 7/1992 | Ng ....................................... | 358/459 |
| 5,166,809 | 11/1992 | Surbrook ........................... | 358/456 |
| 5,235,435 | 8/1993 | Schiller ............................... | 358/456 |
| 5,253,084 | 10/1993 | Rylander ............................ | 358/456 |
| 5,267,054 | 11/1993 | Chang et al. ...................... | 358/456 |

FOREIGN PATENT DOCUMENTS

| | | | |
|---|---|---|---|
| 1901101 | 10/1970 | Germany . | |
| 2307374 | 8/1974 | Germany ........................... | G03F 5/00 |
| 2323222 | 11/1974 | Germany ........................... | G03F 5/00 |

OTHER PUBLICATIONS

RCA Review, Sep., 1970, "Electronically Generated Half-tone Pictures" by R. J. Klensch et al, pp. 516–531.

*Primary Examiner*—Leo Boudreau
*Assistant Examiner*—Jon Chang
*Attorney, Agent, or Firm*—Hill, Steadman & Simpson

[57] ABSTRACT

A method for generation and storage of digitized threshold density values for use in creating a half-tone image pattern such as in the form of color separations. The threshold density values in a sub-cell of a multiple reference cell (supercell) are stored as storage words in accordance with a spot function. A sorted sequence is determined tailored in accordance with the spot function and threshold density values are allocated to the words in accordance with position of the words in a sorted sequence. Corrections are made to the threshold density values in order to compensate for different numbers of storage words in the subcells.

3 Claims, 6 Drawing Sheets

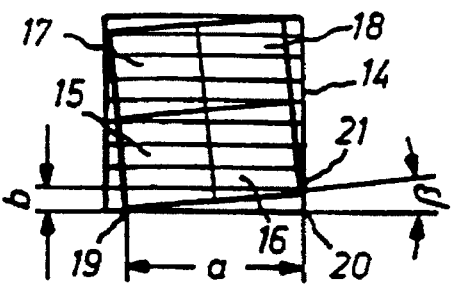
Fig. 1
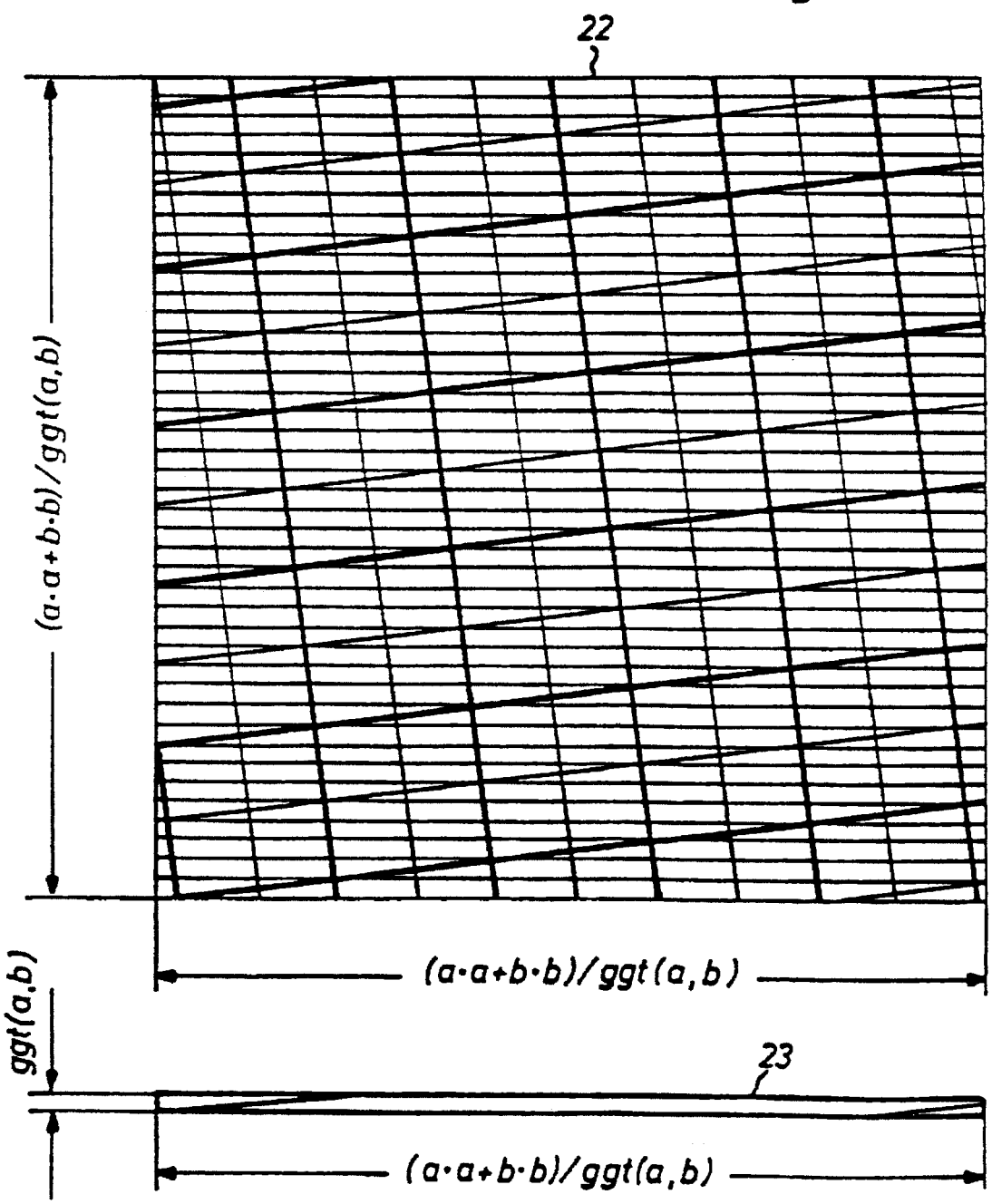
Fig. 2
Fig. 3

METHOD FOR GENERATING AND STORING DIGITALIZED DENSITY THRESHOLD VALUES FOR THE RASTERING OF A HALF-TONE PICTURE ORIGINAL

This is a continuation of application Ser. No. 07/976,974, filed Jan. 19, 1993 now abandoned.

BACKGROUND OF THE INVENTION

The invention relates to a method for generating and storing digitalized density threshold values for the rastering of a half-tone picture original for the rastering of a half-tone picture original such as in the form of a color separation wherein at least one data storage the density threshold values of a segment of a raster are stored in dependence on a spot function as storage words.

The raster may be rotated opposite a scanning direction of a recording means which scans a recording carrier along scanning lines. Boundary lines of the segment of the raster extend in the scanning direction as well as in the direction rectangular thereto.

For the rastered recording of tonal value signals (picture signals) obtained by scanning of the half-tone picture original, it has been known to superimpose these tonal value signals with density threshold value signals (raster signals) of a raster rotated relative to a recording direction (German Patent Specification No. 1,901,101). The density threshold value signals, or raster signals, correspond to a density structure contents of a segment taken from the selected rotated raster, the boundary lines of which segment are arranged in the recording direction and in an advance direction orthogonal thereto. In the segment, the basic period of the structure of the rotated raster is contained once relative to each of the two-orthogonal directions. The segment in the scanning direction as well as at right angles thereto encompasses a plurality of raster points (spots) which are periodically arranged next to and above one another.

This segment may also be referred to as the multiple reference cell or the supercell. As a result of the periodicity of the segment of the rotated raster, the density threshold value signals (raster signals) can periodically be repeated without any difficulties in order to be superimposed by the tonal value signals of larger picture formats, or picture segments, respectively. The raster segment may, in addition, be resolved into so many partial lines extending in the picture recording direction that upon one picture line width a plurality of such partial lines will fall. In order to perform the described prior art process, use is made of data storages in which the density threshold values of the raster segment are digitally stored. Imagined visually, the density threshold values so stored may also be referred to as density fill or threshold fill, respectively. The density threshold values are so stored in the data storages so that the required raster information is fed by previous scanning of a pattern raster and quantizing and coding of the raster signals. The digital density threshold values thus contained in the data storages serve to be retransformed for superimposition with the tonal value signals scanned line by line wisely from the picture original into analog values and to be subsequently supplied to superimposition and threshold value units. When scanning an optical picture, round, oval or rectangular point shapes are typically employed which grow from the middle.

The problem on how in detail the density threshold values to be stored are suitably formed in order to so reproduce, in rastered fashion, a half-tone picture original so that the half-tone picture uniformly, or "quietly" acts over a partial surface which has the same tonal value, is not dealt with for the case that the threshold values, instead of by scanning of an optical picture, are formed fully in digital manner in accordance with a two-dimensional function. This function is also referred to as a spot function. For a fully digital generation of the density threshold values of the raster points of a multiple reference cell (supercell) in accordance with the state of the art known from practice, to start with the total number of storage words of the multiple reference cell is determined. The determination of the total number may be conducted in dependence on the raster angle, the raster width and the resolution of the system. A sorted sequence of the storage words of the multiple reference cell which depends on the spot function is then formed. The storage words of the multiple reference cell will then be assigned density threshold values in linear dependency on their position in the sorted sequence.

In fact, the individual raster points (spots) of a multiple reference cell (supercell) are somewhat different insofar as the number of the storage words assigned to one raster point each varies and does not, as a rule, correspond to the nominal value resulting from the total number of the storage words of the multiple reference cell and the number of the raster points, or subcells, respectively. This leads to the consequence that in neighboring raster points, more pixels or less are set if, depending on a predetermined gray tone, a particular fraction of all the pixels assigned to the multiple reference cell is to be blackened. Thereby, the observer of the reproduced half-tone picture original receives the impression of differently large black points on a white background and, in any case if the tonal value is distinctly less than 50 percent. If on the other hand, a darker gray tone, which is distinctly over 50 percent, for instance 70 percent, is reproduced by using a multiple reference cell, for similar reasons as given above, for low gray values the impression of differently large bright spots on a black background will come up. In both cases, the reproduced half-tone picture is not quiet.

SUMMARY OF THE INVENTION

It is therefore an objective of the present invention to so further develop a method for generating and storing digitalized density threshold values for the rastering of a half-tone picture original of the kind referred to in the beginning that density threshold values are generated by means of which a half-tone picture original is so rastered that the half-tone picture reproduced thereby conveys an even, or quiet, impression.

This problem is solved according to the invention wherein a method is provided for generating and storing digitalized density threshold values for the rastering of a half-tone picture original. In at least one data storage, the density threshold values of a segment of a raster as storage words are stored in dependence on a spot function. In the segment, a plurality of spots (raster points) each comprising a number of storage words are periodically disposed in side-by-side relationship and one upon the other, thus forming a multiple cell (super cell). For the storage words of the data storage of the segment, a sorted sequence is determined depending on the spot function. Depending on the position of the storage word in the sorted sequence, density threshold values are assigned to the storage words of the data storage. The assignment of the density threshold values to the storage words of the data storage occur in a non-exclusive linear dependence.

The method of the invention also includes the formation of the correction criterion as well as the implementation of the correction with reference to the individual spot.

The solution principle more concretely includes a tonal value correction. Correction functions are stored in the function generator. Dependent on the position of the storage words in the sequence sorted according to the criterion of the spot function, the function generator determines the amount of the density threshold values to be assigned and thus defines the plurality of pixels to be blackened according to the criterion of a gray scale value. A parameter can thereby be allocated to a respective spot, i.e. to a subcell of the multiple reference cell. This parameter corresponds to an identified deviation of the actual number of storage words from the rated number of the respective spot (subcell). If the actual value is equal to the nominal value, there is no correction and the amounts of the density threshold values to be issued are proportional to the position of the storage words in the sorted sequence. Thereby, the increase of the pixels to be blackened is also proportional to the requested tonal value. If the actual value of the storage words is greater than the nominal value for the respective spot, or the subcell, respectively, higher density threshold values are distributed for storage words at the beginning of the sorted list in order to lower the increase of the pixels to be blackened for low tonal values which is referred to as undermodulation. For the identical case of a relatively great actual value of the subcell, the density threshold values are lowered in case of storage words at the end of the sorted list in order to obtain a constant number of white picture points.

The latter case is referred to as overmodulation. In case of overmodulation and undermodulation, the increase of the number of pixels to be blackened proceeds, depending on the gray step or the tonal value, parallel to an ideal curve, which is true for the case that the actual value of the storage words is equal to the nominal value for the respective spot (raster point). This parallelism of the curve, particularly the straight-line sections, transferred to the function, is referred to as constant undermodulation or overmodulation, respectively. Methods including non-constant under or overmodulation might, in general, be conceivable as well.

In the other case when the actual value of the storage words is relatively small, the density threshold values are lowered for positions at the beginning of the sorted sequence, and by so doing, the number of the pixels to be blackened at low tonal values is overincreased, which again is referred to as overmodulation. In contrast thereto, for the same relatively low actual value of the spots, the density threshold values are increased at the end of the sorted sequence in order to reduce the number of the pixels to be blackened at high tonal values, which is referred to as undermodulation.

Tonal value correction is particularly conducted in that at one low tonal value each distinctly below 50 percent, optimization is performed on the same number of black pixels of the reproduced raster point, independently from the actual number of storage words thereof. On the other hand, at one tonal value each distinctly higher than 50 percent, optimization is made on the same number of white pixels of the raster point independently from the actual number of storage words thereof. At a tonal value of about 50 percent at which the white and the black areas are at equilibrium, no or only small corrections are made. Correction values result therefrom, which, depending on the raster point and the tonal value, more or less under or overmodulate the individual raster points. The correction values enter into the generation of the density threshold values of the super reference cell separately for each subcell. The rastering process can conventionally be performed using the stored density threshold values. This simplifies the practical introduction of the process.

Between the region of the overmodulation and of the undermodulation realized by the function generator, a transition area is provided. In the latter, overmodulation and undermodulation is reduced when approaching the tonal value of 50 percent. At this tonal value of 50 percent, neither over nor undermodulation is desired. The transition area can be realized by implementing a function of a higher order.

The function generator forms in the transition area a linear connection between the number of the pixels to be blackened or the corresponding density threshold values, and the sorted sequence, respectively. This connection may relatively simply be realized in the function generator.

The correction stage generates the threshold values preferably in accordance with the criterion of the function areas which realize a stepwise cancell also retrieval of the under and-overmodulation.

When using a spot function wherein, as is common, the spots (raster points) grow out of the middle, disturbing different sizes of white points might again occur in the reproduced half-tone pictures between the blackened raster points in that the white pixels of the raster points meeting at the corners as a rule are irregularly distributed over the corners. In practice, consequently the size of the white points varies, and the impression the reproduced picture imparts is not quiet.—As a remedy, a process is employed in case of relatively large tonal values, i.e. preferably larger than 50 percent. This so-called white correction requires a further auxiliary measure, namely the subdivision of each spot into four quadrants. In order to obtain the tonal value described in the foregoing, one square each is composed from one quadrant each of four neighboring spots, the corners of which meet.

The invention will in the following be explained in more detail based on the drawing including nine figures, wherein

BRIEF DESCRIPTION OF THE DRAWINGS

FIG. 1 shows a rotating multiple spot composed of two times two square spots, or raster points, disposed one upon the other and in side by side relationship, and which is arranged in the smallest comparison field at the edges of which the corners thereof are disposed;

FIG. 2 shows a multiple reference cell wherein a number of rotated multiple spots are joined together;

FIG. 3 shows a reduced segment as a reference area from the multiple reference cell wherein the segment in one of the two orthogonal directions, namely the height, is substantially smaller than the multiple reference cell and wherein the invention is also applicable to the reduced segment as the reference area;

DESCRIPTION OF THE PREFERRED EMBODIMENTS

Figure 4:
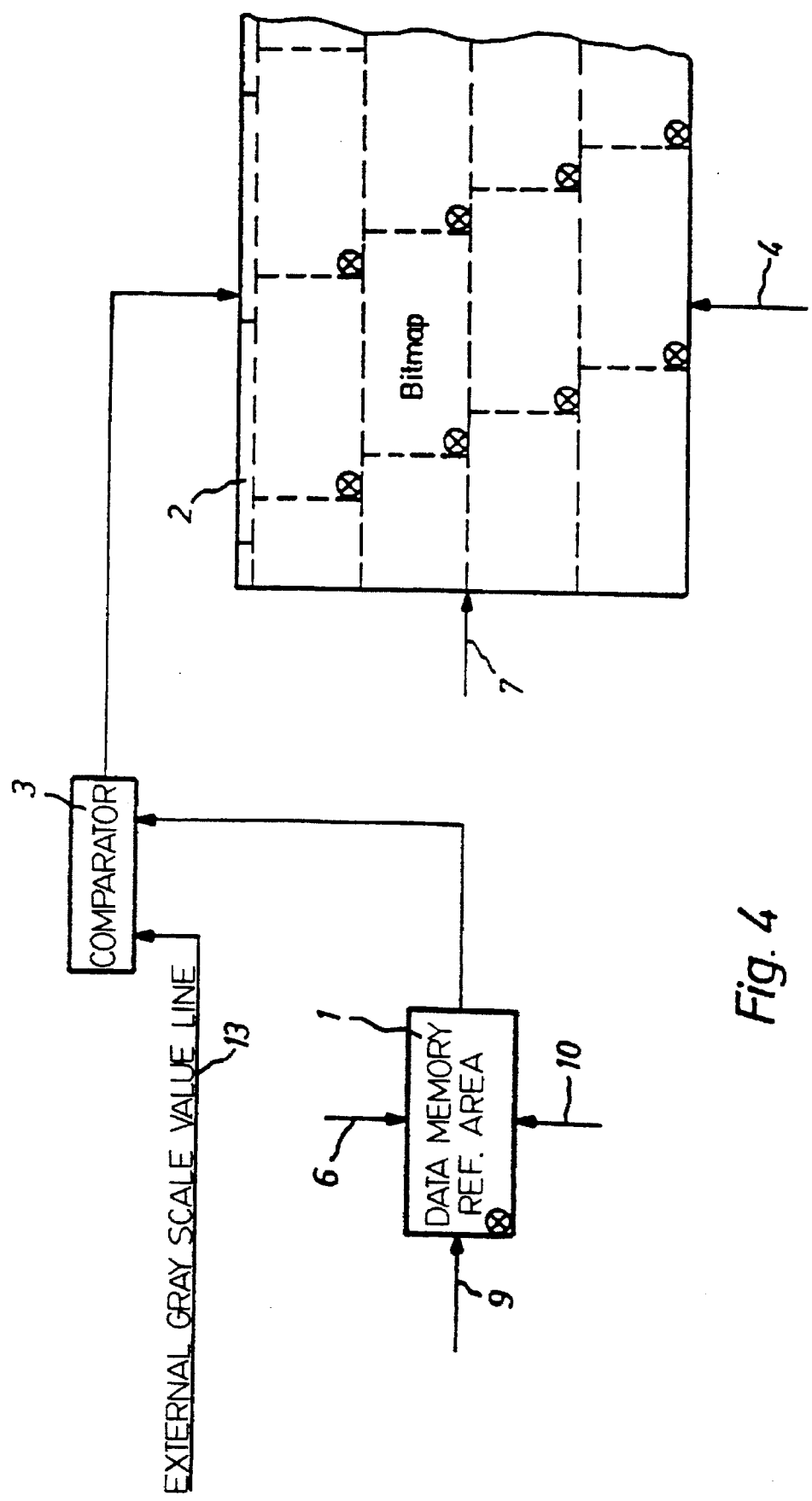
FIG. 4 shows a simplified portion of a structure of an apparatus for digital rastering of a half-tone picture original.

In FIG. 1, 14 refers to a smallest comparison field, wherein n·n, where n=two, spots or raster points 15–18 are disposed in rotated fashion next to and over one another so that the total arrangement is rotated relative to the smallest comparison field. Subcells of the comparison field correspond to the spots. In the smallest comparison field, the magnitudes a and b are defined by the arrangement of the multiple spot, where a is the distance of a corner point 19 of the group of spots 15–18 to the corner 20 of the comparison field. Magnitude b is the distance oriented at right angles relative thereto between this corner 20 of the comparison field and another corner point 21 of the group of the points. A raster angle around which the group of raster points or spots 15–18 is rotated relative to the recording direction which extends parallel to two edges of the smallest comparison field is referenced 14.

By the grouping of a number of spots in the smallest comparison field, as described in connection with FIG. 1 the raster angles and raster widths with an increasing number of spots can become arbitrarily fine, provided that the corners of the group of spots are always assigned, in a defined way, to one pixel each of the comparison field subdivided in pixel distances or impinging on this pixel.

The number of storage words per spot varies because of a digitalization effect which is caused by the assignment of the storage words to a spot at the assumed border line thereof. The spot is assigned those storage words whose centers lie within the borderline of the spot. The actual value of the storage words in the spot results therefrom.

The requirement of periodicity of the multiple reference cell 22 (supercell) assembled by means of such multiple spots normally leads to relatively large multiple reference cells since the groupings of the spots are repeated until the periodicity or the wrap-around condition, respectively, is obtained in each of the two orthogonal directions of the multiple reference cell.

The reference area 23 shown in FIG. 3 constitutes a defined segment from the multiple reference cell according to FIG. 2. It can be seen that the extension of the reference area in one of the two orthogonal directions, i.e. the width, is the same as the width of the multiple reference cell, namely $$W=(a \cdot a + b \cdot b)/ggt(a,b).$$

In the direction orthogonal thereto, i.e. the height, the extension of the reference area, however, is quite considerably reduced relative to that of the multiple reference cell, namely about $$ggt(a,b)$$

where this greatest common divisor of a and b in the square pixels here assumed constitutes the width or the height, respectively, of a pixel.

The displacement by which each entry is made into the reference area of FIG. 3 when scanning in the scanning line direction or in the width direction once the density threshold values have been read out from the reference area in this case amounts to 57 with a width of 65. In the direction of scanning line X (where X has not been shown in the Figure), each new X position each at which reading out of the density threshold values starts is $$X_{new} = (X_{old} + \text{displacement}) \text{ modulo } w$$

wherein the width w is $$W=(a \cdot a + b \cdot b)/ggt(a,b)$$

The density threshold values for each storage word of the multiple reference cell of a spot or a raster point, respectively, are primarily predetermined by a spot function. The aspects of the present invention relate to the correction of these density threshold values determined by the spot function.

In FIG. 4, the structure of a device is very simply shown, by means of which the method for the digitalized rastering of a half-tone picture original is executed by using a data storage wherein only the density threshold values of a reduced segment of a raster 23 according to FIG. 3 rotated opposite the scanning direction are stored. The device according to FIG. 4 includes as a portion of a raster image processor, means for storing signals in a bitmap 2 in dependence on a comparison result for the dark/bright control of a recording device not shown in FIG. 4. This occurs as though a multiple reference cell 22, in accordance with FIG. 2, were available as a complete segment of the raster for the comparison of tone signals of a scanned half-tone picture original to be rastered to given threshold values.

In the data storage of reference area 1, density threshold values of the reference area, which represents only a reduced segment, are stored in accordance with a spot function including subsequent corrections, and are columnwise and linewise addressable. Bitmap 2 is also columnwise and linewise addressable so that individual storage locations (bits) have to be set, or not to be set, in accordance with a comparison performed in a comparator 3.

For column addressing of bitmap 2 an input 4 is provided and for linewise addressing an input 7. The linewise addressing of the data storage of reference area 1 occurs at an input 9, and for displaced addressing of the reference area wherein the density threshold values of a reduced segment of the raster are stored, an input 6 is provided at data storage 1.

For cycled operation of the apparatus shown in FIG. 4, at each clock pulse a bit of bitmap 2 is addressed, on one side, and a threshold value is addressed in the data storage of the reference area on the other, which corresponds to the addressed bit. The threshold value signal therefore obtained at the output of data storage 1 is compared, in comparator 3, with a tone value signal on tonal value lead 13, which signal has been obtained by scanning of the half-tone picture original and, if necessary, by subsequent signal processing. The result of this comparison conducted in comparator 3 is entered, in binary form, into the bit addressed as described in the foregoing in bitmap 2, which bit therefore is set, or is not set, in accordance with the tonal value and the addressed location of the reference area. For the bright/dark control of a recording device not shown, this contents is read out from bitmap 2.

The following detailed description of the method of the invention from which further features and advantages thereof can be taken starts from a reference area of the multiple reference cell according to FIG. 3 as described in the foregoing. The reference area includes n·n raster points (spots).

For explanation, reference is made to two different coordinate systems which are in a determined relation relative to each other. To simplify matters, it is assumed that the two coordinates are orthogonal and include identical scalings for the two axes.

The first coordinate system is that of the bitmap—compare 2 in FIG. 4. The bitmap is an image of the pixels of the reproduction device. Each bit of the bitmap has the width and the height of one unit. The axes are designated by x and y.

The second coordinate system is that of the spots, wherein one spot has the width and the height 1. The axes are designated by x' and y'—compare also FIG. 7. This x', y' coordinate system as a rule is rotated about an angle $\beta$.

Conversion of x,y to x',y' coordinates can be performed in accordance with the following formulas:

$$x' = k \cdot x \cdot \cos \beta + k \cdot y \cdot \sin \beta$$

$$y' = -k \cdot x \cdot \sin \beta + k \cdot y \cdot \cos \beta$$

where the constant k is the conversion factor of a length unit of the x,y space into the x',y' space.

As the coordinate of a pixel, the center thereof is taken. The coordinate of the pixel in the origin of the x,y space is therefore 0.5|0.5 rather than 0|0 as could have been expected.

Furthermore, the following is determined: the desired tonal value is shown by an integer between 0 and $g_{max}$, where $g_{max}$ is the maximum threshold value. The tonal value 0 corresponds to black (100% color) and $g_{max}$ corresponds to white (0% color). In order to realize the tonal value g, all bits of the bitmap whose respective values in the reference cell contains values smaller than g would be set to 1. The numerical value of the words in the reference cell, therefore, determine the sequence in which the bits have to be set for increasingly darker gray. These numerical value signals are also referred to as threshold values, and the reference cell is also referred to as threshold value fill. One can further see that the blackening has to increase monotonously, i.e. a bit (or pixel) once set cannot be reset again for a darker tone. The value range of the threshold values results as $1 \ldots g_{max}$. The number of the representable gray steps thus amounts to $g_{max}+1$.

In case of raster points (spots) including more than $g_{max}$ elements (pixels), threshold values occur twice, and in case of spots having less than $g_{max}$ elements, not all of the possible numerical values are represented, i.e. the number of the representable gray steps is smaller. In order to assure a continuous tonal increase, It is in both cases necessary that the threshold values be uniformly distributed over the address space $1 \ldots g_{max}$.

The threshold values are assigned in the reference cell in case of a digital realization based on a two-dimensional function (spot function) with the input parameters x' and y' normalized to the range $0 \ldots 0.99$. x' and y' each describe a coordinate within the area of the spot. From the function values delivered back from the spot function, the threshold values could be directly deduced. In order to safeguard a homogeneous distribution of the threshold values over the value range thereof, an intermediate step is provided. Therefore, the spot function for each element of the spot is called and the function value delivered back is entered, together with the x,y coordinate of the element, into a list. The list elements are sorted in the sequence of the function values. The threshold values of the elements entered in the sorted list result as follows:

$$sw = m_0 \cdot i + 1$$

where sw=threshold value i=position of the element in the sorted list $$m_0 = \frac{g_{max}}{\text{number of the list elements} + 1}$$

By this, the continuous distribution of the threshold values is determined.

For the multiple reference cell, the process has to be repeated for all subcells (=spots) in order to assign a threshold value to all elements of the multiple reference cell.

As concerns the necessity of a tonal value correction, one should start from the fact that each spot in a multiple reference cell only in theory includes an equal number of elements. In practice, however, this number varies due to the digitalization effects of the ideal spot. One has therefore to differentiate between a nominal value and an actual value. The actual value of a spot results from counting the elements after the digitalization of the edges of the spot. The nominal value results from $$\text{nominal} = (a \cdot a + b \cdot b)/(n \cdot n)$$

As has been explained in the foregoing, differently sized black (or white, respectively), marks in the different spots of the multiple reference cell will result at a determined tonal value from the difference between the nominal and the actual number of elements.

In order to perform for levelling the black (or white, respectively) marks of the spots under and overmodulation correction generally described in the foregoing, the threshold value is generated in accordance with a function which is subdivided in three sections (function areas):

1st section for 0<i<actual value . $S_1$:

$$sw = f_1(i) + 1 = m_{nominal} \cdot i + 1$$

where $$m_{nominal} = \frac{g_{max}}{\text{nominal value} + 1}$$

2nd section for nominal value . $s_1 < i <$ actual value . $s_2$:

$$sw = \frac{s_2 - i}{s_2 - s_1} \cdot f_1(i) + \frac{i - s_1}{s_2 - s_1} \cdot f_2(i) + 1$$

3rd section for actual value . $s_2 < i <$ actual value $$sw = f_2(i) + 1 = m_{nominal} \cdot i + b + 1$$

where $b = m_{nominal} \cdot$(nominal value—actual value).

The values $s_1$ and $s_2$ fulfill the mathematical inequality $0 < s_1 < s_2 < 1$ and are empirically determined. In practice, values of about 0.3 and 0.7 for $s_1$ and $s_2$ have been shown to be useful. The relationship for the 2nd section effects a continuous transition from $f_1(i)$ in the 1st section to $f_2(i)$ in the 3rd section. Using more sections or functions of higher order or different kinds of transition in the 2nd section for the purpose of a fine tuning is more complicated.

In the 1st and the 3rd sections, the errors that result from deviations of the actual value of the pixels of a spot from the nominal value have been completely corrected. If the actual value of a spot deviates particularly strikingly from the nominal value, this will still be distinct in the middle 2nd section. This can be moderated in that depending on the actual value, a tolerable error is permitted in sections 1 and 3 in order to homogenize the spots in the 2nd section somewhat relative to each other.

As concerns the white correction described more generally in the foregoing, the spots are additionally subdivided in quadrants which are each differently combined for tonal values from 0 to 50% and 50 to 100%. By doing so, the tonal value correction is bisected, too.

For this purpose, the procedure is as follows:

1. For all quadrants of all spots of the multiple reference cell, sorted lists are prepared as have been described before.

2. For each spot of the supercell, the sorted lists (quadrant lists) of the four quadrants are collated. This is done in an additional reference list. The entries of this reference list indicate individual entries in the four different quadrant lists. The references are so distributed that they again form a (indirect) list sorted according to function values. This process can imagined such that all four quadrant lists are virtually combined to form a new list and are newly sorted. This process is referred to as "merging". Subsequently, the correction curves are determined according to the functions subdivided in section and explained in connection with the tonal value correction, and the threshold values are distributed for the first half of the elements of the reference list. Each entry in the quadrant list to which a threshold value has been assigned is marked as invalid. In this way, the threshold values for 0 through 50% are assigned.

3. Now, the threshold values for 50 through 100% have to be assigned. For this purpose, one quadrant each of four neighboring spots are merged in the way described above. Since in the above step already, half of the elements was processed, a correspondingly lower actual value is obtained which is therefore doubled before the correction curves are determined. The threshold values are generated in accordance with a slightly modified formula:

$$sw = f(i) + \frac{g_{max}}{2} + 1 \text{ (instead of } sw = f(i) + 1\text{)}$$

where f(i) constitutes the section wise defined correction curves. The higher displacement of $$\frac{g_{max}}{2} + 1$$

compensates the threshold values already processed in the foregoing step.

Figure 5:
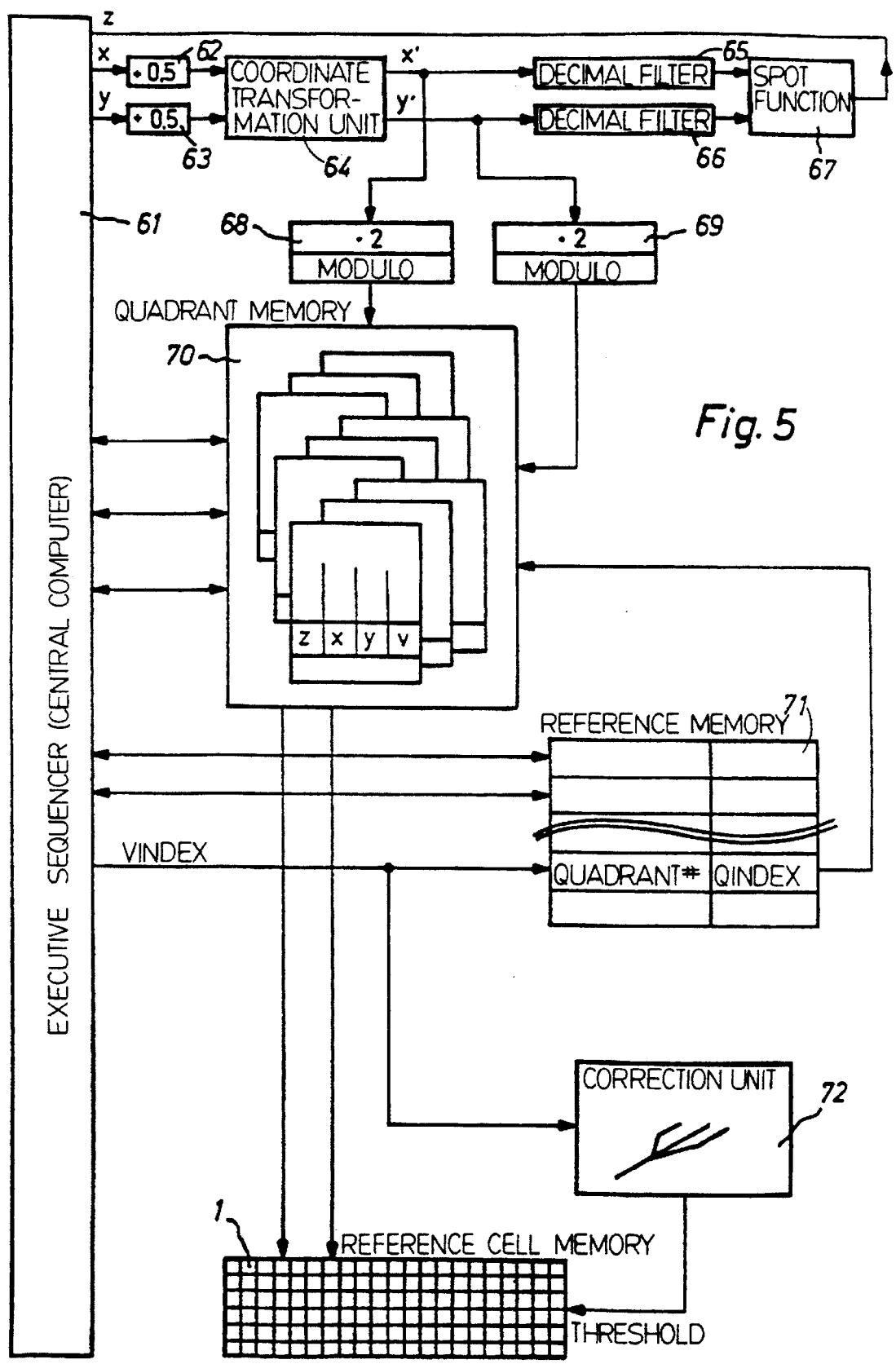
FIG. 5 shows a block diagram of an exemplified apparatus for tonal value correction and white correction.

In the exemplified device for the tonal value and white correction according to FIG. 5, generation of the threshold values for the multiple reference cell, which is equal to the data storage 1 of the reference area, occurs in several steps.

To start with, the function value of the spot function has to be determined for each element of the multiple reference cell, and must be temporarily stored in quadrant storages 70 which contain the quadrant lists. For this purpose a process control 61 consecutively generates consecutively the possible value pairs for x=0 ... (w−1) and y=0 ... (h−1). The following description of the processes should be repeated for all value pairs: To x as well as to y, 0.5 is added in the beginning in adders 62, 63, in order to describe the center of the element to be processed. This value pair is then transformed in a coordinate transformer stage 64 into value pair x' and y'. Value pair x' and y' arrives, at one hand, via decimal filter stages 65, 66 which allow only after-point digits to pass, at spot function generator 67. At the output of the spot function generator, the result z of the spot function is available.

On the other hand, x' and y' are employed for determining the quadrant to which the actual value pair belongs. This is done in that x' and y' are first multiplied by 2 in multipliers having modulo stages 68, 69 and are subsequently imaged by the application of modulo (2·n−) to the range 0 ... (2·n−1), 0 ... (2·n−1). The value pair so obtained selects the quadrant from a quadrant storage 70. Quadrant storage 70 comprises (2·n) (2·) storage blocks (quadrants). To each quadrant, a storage area is assigned, and under each address a data quartette can be stored. This quartette comprises a function value z, the value pair x/y and a validity bit v. The quadrant storage 70 includes thereafter a number counter, not shown, which stores the number of the used entries. The values z and x/y are sorted in ascending sequence for the value z into the selected quadrant, and the respective validity bit v is set. The number counter is thereafter increased by 1.

The next step is to distribute the threshold values for 0=50% in the multiple reference storage. This is done in n·n cycles, where in each cycle four quadrants each of a spot are processed. In each cycle, to start with a reference list is installed in a reference storage 71. The reference storage comprises a storage area. Each element of the storage area contains a data duet: the selection number of a quadrant and the address of a data quartet within the quadrant (qindex). This is also referred to as "indirect addressing". For each data quartet in the four selected quadrants, an entry in the reference storage is generated. This is performed in that the entries in the reference storage indicate to the quadrant data quartets in a sequence sorted according to z.

The number of entries in the reference storage is also identical to the number of threshold value elements (corresponding to pixels) for the spot processed in this cycle and hence to the actual value of the storage words for the parameter calculation for the correction stage. The processes in the correction stage have been described in the foregoing. The process control calculates the parameters $m_{nominal}$, b, actual value . $s_1$, and actual value . $s_2$, and enters It into a correction stage 72 with a function generator. It is in this function generator where the actual threshold value assignment occurs. For this purpose, by vindex=0 ... (actual value/2) one entry each is subsequently addressed in reference storage 71, and thereafter, via the contents thereof, a data quartet is addressed from a quadrant of quadrant storage 70. The x/y value pair from the data quartet, again, addresses an element of the multiple reference cell 1. vindex is also fed to correction stage 72, and at the output thereof, the threshold value is available which is assigned to the addressed element of the multiple reference cell. In addition, the validity bit v is cancelled as well. The process is repeated for vindex only up to actual value/2 since only threshold values up to 50% are assigned in this step.

The functions which are realized by means of the function generator in correction stage 72 will be explained based on three corrected characteristics in FIG. 6. The characteristics constitute the connection between the index of the sorted sequence of storage words of a spot (abscissa) and the threshold value (ordinate). Curve A constitutes the ideal combination, wherein the actual value of the number of storage words of a spot is equal to the nominal value. Curve B shows the case that a spot indeed includes less storage words than corresponds to the theoretical nominal value. On the other hand, curve C constitutes the case where the actual value of the storage words of the spot is larger than the nominal value.

Figure 6:
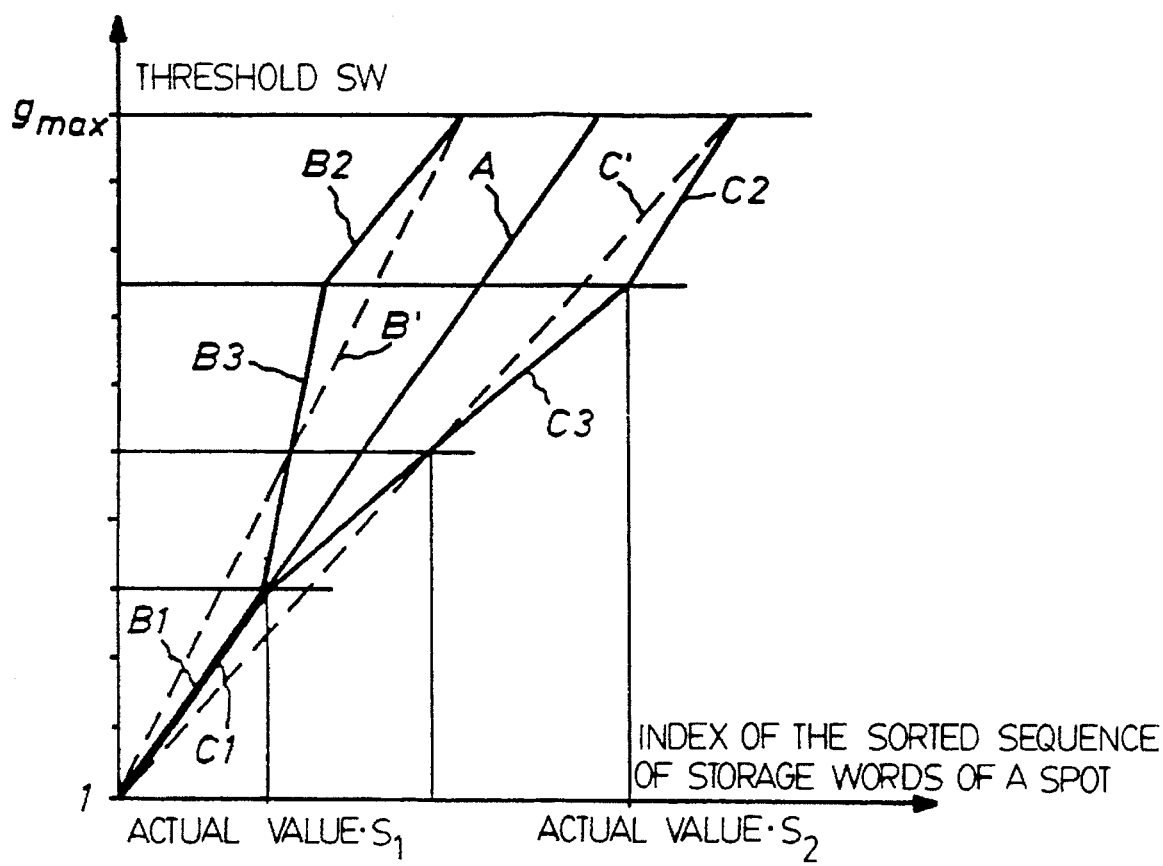
FIG. 6 shows characteristics of a function generator as a portion of the apparatus according to FIG. 5.

FIG. 6 shows that for the ideal curve A, the same linear connection exists between the index in the sorted sequence and the density threshold value (that is to be assigned). As concerns the polygon C1–C3, on the other hand, the ideal curve A is followed for elements from the beginning of the sorted sequence up to actual value . $S_1$ in a first section C1 as a result whereof the assigned threshold values are increased, thus the number of actually blackened pixels for light gray shades is undermodulated. At the same curve C1–C3, for elements, however, from actual value . $s_2$ up to the end of the sorted sequence, one follows a curve in parallel to the ideal curve A which corresponds to a decrease of the threshold values, and hence an overmodulation—compare section C2. The overmodulation at C2 and the undermodulation at C1, respectively, become apparent as compared to a curve C' depicted in a broken line, which shows the connection between the index of the sorted sequence and the threshold value without correction. The undermodulated section C1 and the overmodulated section C2 are connected by an equalizing section C3. In that section, the undermodulation continuously goes back from section C1 to the position actual value/2, which also corresponds to a tonal value of 50%, where neither over nor undermodulation occurs, and subsequently increases in overmodulated fashion up to section C2. The polygon B1–B3 includes a section B1 for elements at the beginning of the sorted list where the threshold values are lower and hence more pixels are blackened (overmodulation) than without correction, as can be taken from uncorrected line B'. Section B2 constitutes a section of undermodulation. The two sections B1 and B2 are bridged by an equalizing section B3.

By the process executed by means of the apparatus according to FIG. 5, when reproducing small gray shades, optimization is actually made to the same numbers of pixels to be blackened for the individual raster points (spots) 15–18 of FIG. 1; and in case of large gray shades, optimization is made to equal numbers of white (unblackened) pixels.

Figure 7:
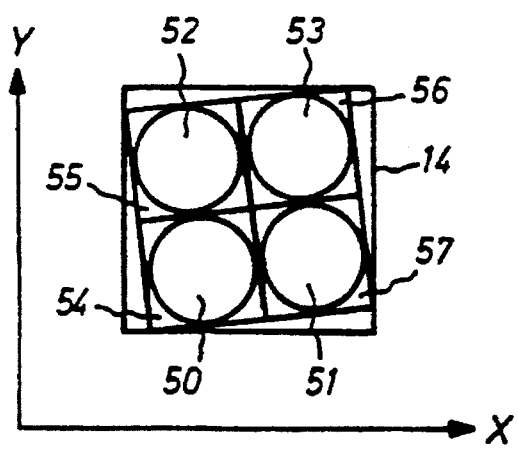
FIG. 7 shows the multiple spot in the smallest comparison field according to FIG. 1, wherein each spot is subdivided in four quadrants for white correction.

The white partial areas (marks) are however concentrated in the corners of the raster points for the most common spot functions where the black marks grow from the middle of the raster points. This means that the white marks or points perceived by the eye are composed, in case of square raster points, of sections of four raster points. This is indicated in FIG. 7 wherein the blackened portions of the raster points are only indicated by circles 50–53 which encompass the black marks. Since now the white marks are composed of white areas of a plurality of raster points, the size of the white marks may vary even then when the numbers of the white or unset pixels have been optimized as described in the foregoing in accordance with the gray value correction in case of high tonal values for the individual raster points.

In order to also eliminate these variations of the size of the white points, each raster point, or spot, respectively, is subdivided in four quadrants. In FIG. 7, the subdivision is indicated by broken lines. A central white mark thus is composed of the quadrants 54–57 of different raster points.

Finally, the threshold values for 50–100% of the white correction have to be assigned. For this purpose the process described in the foregoing in connection with the tonal value correction is repeated in a somewhat modified way. The program is again performed in n·n cycles. This time however four neighboring quadrants of four neighboring spots are composed. When establishing the reference list in reference storage 71, data quartets whose validity bit v was cancelled, are not considered since for them, threshold values have already been assigned. The number of entries in the reference storage now corresponds only to half of the actual value. The actual value is number of entries in reference storage·2.

When loading the correction stage parameter for correction stage 72, an offset of $$\frac{s_{max}}{2} + 1$$

instead of 1 is loaded in order to obtain the correct threshold values.

Figure 8:
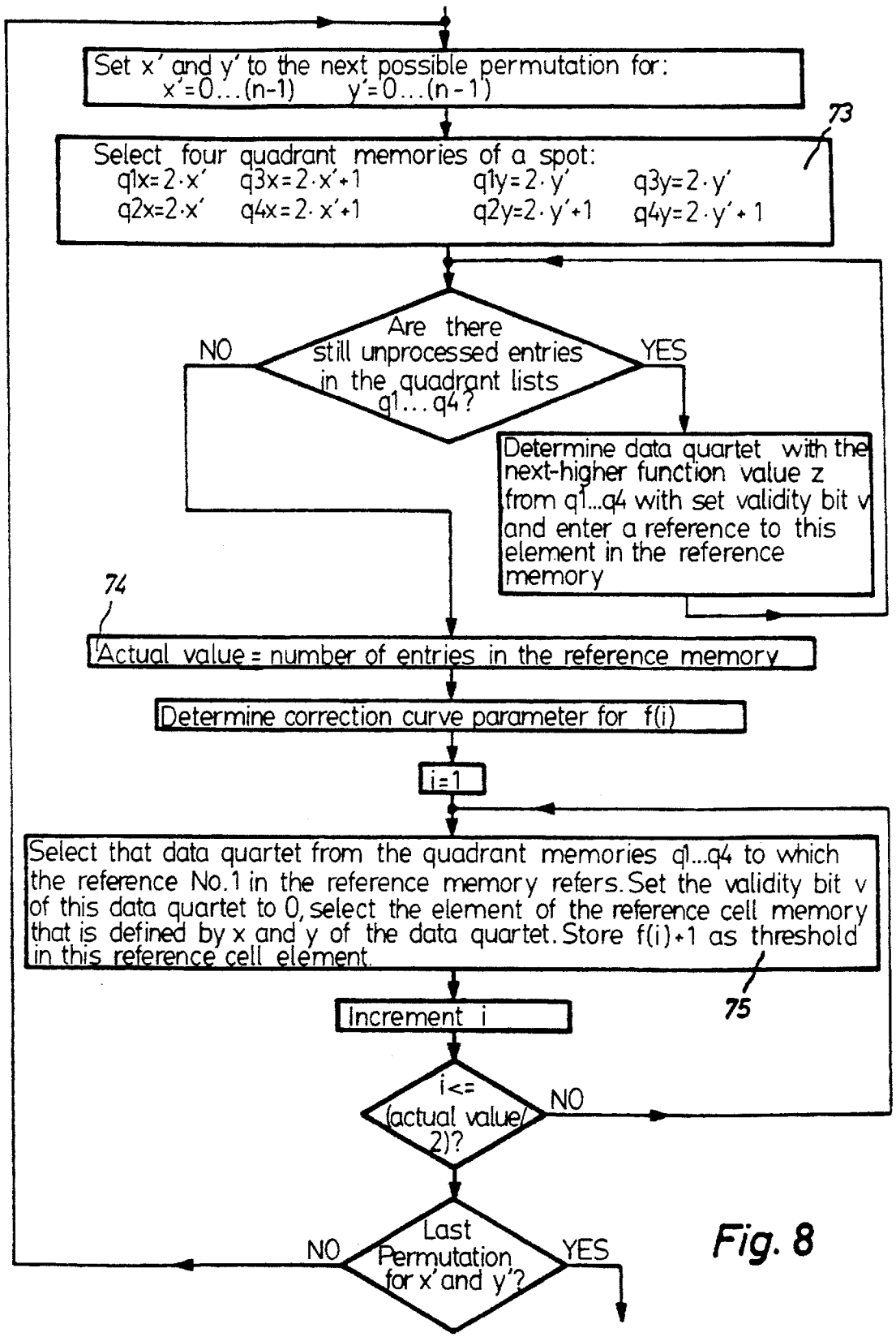
FIG. 8 shows a flow chart for tonal value correction.
Figure 9:
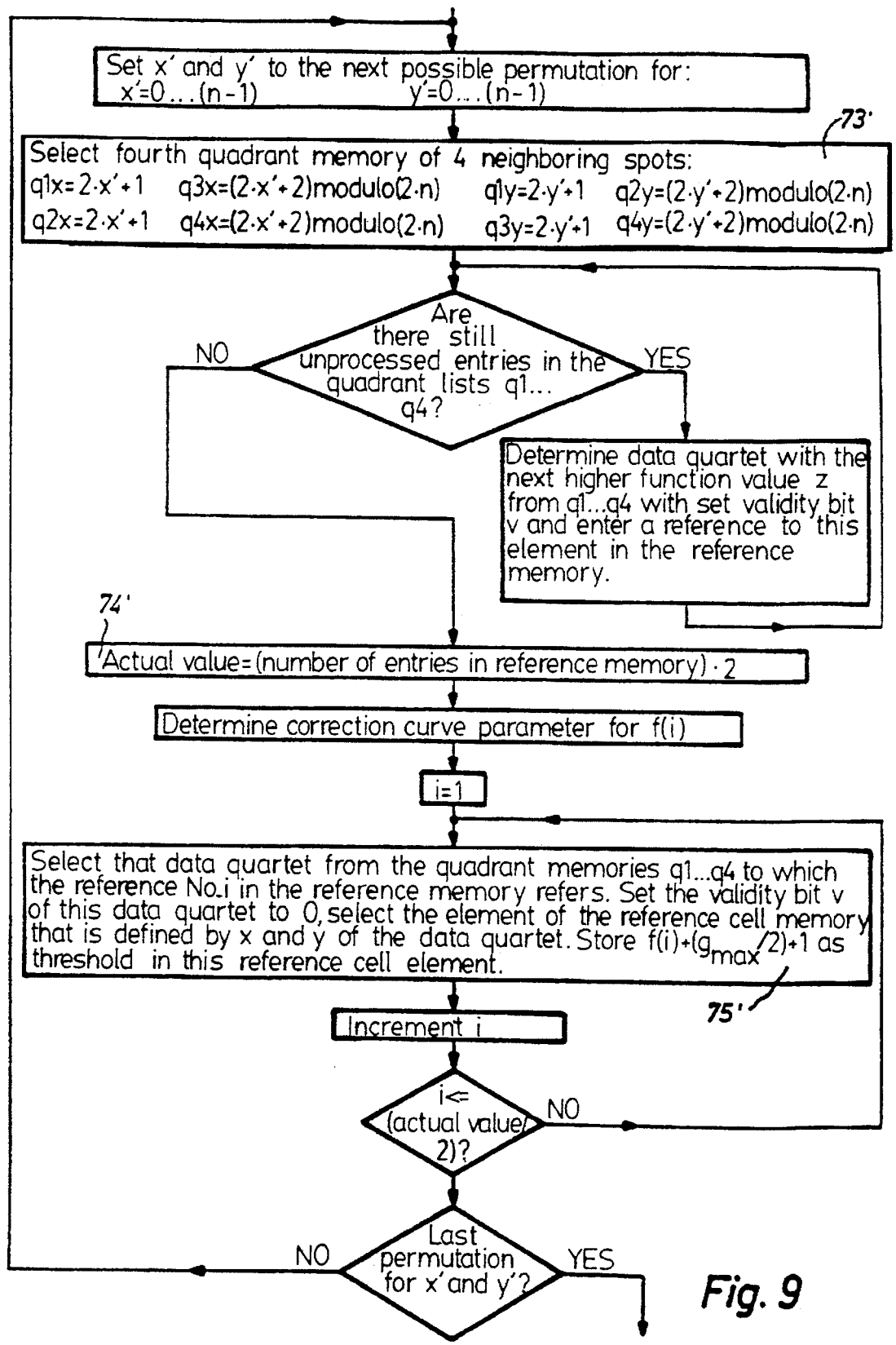
FIG. 9 shows a flow chart for white correction.

The processes described occurring in the apparatus according to FIG. 5 are summarized for the tonal value correction for threshold values 0–50% in the flow chart according to FIG. 8, and for the white correction for threshold values 50–100% in the flow chart according to FIG. 9. It is only the contents of the blocks 73', 74', 75' in FIG. 9 which are different from the corresponding blocks 73, 74, 75 in FIG. 8.

Although various minor changes and modifications might be proposed by those skilled in the art, it will be understood that I wish to include within the claims of the patent warranted hereon all such changes and modifications as reasonably come within my contribution to the art.

I claim:

1. A method for producing a half-tone picture from an input picture using rotated screens, comprising the steps of:

making up the rotated screens with a plurality of orthogonally oriented comparison fields forming a supercell with each comparison field being formed of a plurality of sub-cells, and wherein each sub-cell comprises a plurality of elements with each element having a storage word assigned thereto and corresponding to a pixel of the half-tone image to be blackened or not to be blackened depending on a size of a half-tone raster spot to be grown by use of each sub-cell for a corresponding gray tone level of the input picture to be reproduced as said half-tone spot in the half-tone picture, and wherein the sub-cells have different sizes caused by a number of storage words of the sub-cells differing from a nominal value;

providing a two-dimensional spot function for describing a shape of the spot to be grown by use of each sub-cell, said spot function defining a threshold value to be assigned to each of the elements in each sub-cell;

creating a sorted list of position addresses of the storage words of the elements in each sub-cell depending on the spot function;

assigning density threshold values defined by the spot function to the storage words according to positions of the respective storage words in the sorted list;

as a threshold value correction, if an actual number of storage words is greater than said nominal value for a respective sub-cell, density threshold values are raised for storage words at a beginning of the sorted list and density threshold values are lowered for storage words at an end of the sorted list, and if an actual number of storage words is less than said nominal value for a respective sub-cell, density threshold values are lowered for storage words positioned at the beginning of the sorted list and density threshold values are raised for storage words at the end of the sorted list; and comparing tonal values of the input picture to be reproduced as said half-tone picture to the threshold values of the sub-cells to create a bit map of on/off signals for a binary recording device which decides during reproduction of the half-tone picture by the binary recording device whether a pixel of the half-tone picture is blackened or not.

2. A method according to claim 1 including the further steps of:

where the spot function comprises spots growing from the middle, each sub-cell is subdivided into quadrants and a sorted list of position addresses of the storage words of the elements in each quadrant of each sub-cell is created depending on the spot function;

the sorted lists of each sub-cell are collated to create an additional reference list;

density threshold values are assigned defined by the spot function to the storage words according to positions of the respective storage words in the additional reference list;

performing said threshold value correction using said additional reference list with the assigned density threshold values for the tonal values from 0 to 50%;

for tonal values from 50–100%, one quadrant of each of four neighboring sub-cells have their respective sorted lists merged to create a further reference list;

assigning density threshold values defined by the spot function to the storage words according to positions of the respective storage words in the further reference list; and performing said threshold value correction for tonal values from 50–100%.

3. A method according to claim 1 further including the step of providing the half-tone picture in the form of a color separation.

* * * * *